(12) United States Patent
Borthakur et al.

(10) Patent No.: US 9,846,711 B2
(45) Date of Patent: Dec. 19, 2017

(54) LSM CACHE

(71) Applicant: Facebook, Inc., Menlo Park, CA (US)

(72) Inventors: Dhrubajyoti Borthakur, Sunnyvale, CA (US); Nagavamsi Ponnekanti, Fremont, CA (US); Jeffrey Rothschild, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 423 days.

(21) Appl. No.: 13/730,698

(22) Filed: Dec. 28, 2012

(65) Prior Publication Data

US 2014/0188870 A1    Jul. 3, 2014

(51) Int. Cl.
*G06F 17/30* (2006.01)

(52) U.S. Cl.
CPC .... *G06F 17/30312* (2013.01); *G06F 17/3048* (2013.01); *G06F 17/30345* (2013.01)

(58) Field of Classification Search
CPC ......... G06F 17/30312; G06F 17/30575; G06F 17/30911; G06F 17/30132; G06F 17/3071
USPC ......... 707/769, 609, 741, E17.001, E17.089, 707/602, 603, 610, 613, 634, 684, 691, 707/705, 736, 739, 797, 803, 827; 705/4, 705/14.49, 14.53, 3
See application file for complete search history.

(56) References Cited

U.S. PATENT DOCUMENTS

| | | | |
|---|---|---|---|
| 7,299,318 B2 * | 11/2007 | Stoutamire | 711/118 |
| 7,584,507 B1 * | 9/2009 | Nucci | 726/23 |
| 8,046,538 B1 * | 10/2011 | Stenstrom | 711/119 |
| 8,126,997 B2 | 2/2012 | Lee et al. | |
| 8,156,304 B2 | 4/2012 | Friedman et al. | |
| 8,370,597 B1 * | 2/2013 | Chatterjee | G06F 3/0604 707/651 |
| 8,627,035 B2 * | 1/2014 | Ambat et al. | 711/165 |
| 2012/0072656 A1 * | 3/2012 | Archak et al. | 711/104 |

* cited by examiner

*Primary Examiner* — Jay Morrison
*Assistant Examiner* — Ken Hoang
(74) *Attorney, Agent, or Firm* — Perkins Coie LLP (57) ABSTRACT

A variety of methods for improving efficiency in a database system are provided. In one embodiment, a method may comprise: generating multiple levels of data according to how recently the data have been updated, whereby most recently updated data are assigned to the newest level; storing each level of data in a specific storage tier; splitting data stored in a particular storage tier into two or more groups according to access statistics of each specific data; during compaction, storing data from different groups in separate data blocks of the particular storage tier; and when a particular data in a specific data block is requested, reading the specific data block into a low-latency storage tier.

16 Claims, 6 Drawing Sheets

LSM CACHE

FIELD OF INVENTION

At least one embodiment of the present disclosure pertains to databases and in particular to data storage with caching.

BACKGROUND

The explosion of social networking has led to extensive sharing of information including items such as videos, photos, blogs, links, etc. Existing social networking databases face growing challenges to support highly random writing and reading operations (e.g., new insertion, update and deletion).

Log Structured Merge Tree (LSM) has become a popular solution in many write-optimized databases. AN LSM database typically organizes the data in the storage media in the form of blocks and uses a cache for faster access to recently accessed data. The cache is typically smaller than the entire dataset but has lower latency than the storage media. The LSM database, upon a read request for a data record in a particular data block, pulls in the particular block from the storage media and cache it in memory. However, the cached block may include many data records that are rarely requested. A significant portion of the cache may be wasted in storing these rarely requested data records, resulting in a low cache hit ratio.

Thus, there is a need to improve the efficiency of cache in an LSM database and value in doing so. Solutions to the problem have been long sought but thus far have eluded those skilled in the art.

SUMMARY

Embodiments of the present disclosure provide a variety of methods for improving efficiency in a database system. In some embodiments, a database may be implemented by using a multi-tiered caching architecture, where multiple levels of data are created by use of LSM trees according to how recently the data have been updated. In some embodiments, storage media may be split into multi-tiers according to the latency of individual storage medium. Each level of data can be assigned to an appropriate storage tier. For example, data in the newer levels may be stored in lower-latency storage tiers while data in the older levels may be stored in higher-latency storage tiers.

In some embodiments, data may be organized in the form of data blocks. Each block may contain a number of separate data. The separate data stored within a particular storage tier may be split into two or more groups according to how recently or frequently the data have been accessed (i.e., "hot" and "cold" groups). The two or more data groups may be stored in separate data blocks of a given storage tier. The particular storage tier may be a high-latency, an intermediate-latency or a low-latency storage tier.

When a specific data is read into memory or a low-latency storage tier from one of those data blocks, all other "hot" data in that data block may also be read into the memory or the low-latency storage tier at the same time. This may reduce the likelihood that a future read request requires access to higher-latency tiers. Further, by splitting data into hot data and cold data, data blocks having hot data may be cached more frequently than data blocks having cold data. More hot data can be cached in a given memory or low-latency storage tier, which may reduce the overall read latency.

In some embodiments, a webserver and/or a database system may monitor access statistics of each data and categorize data into a plurality of groups according to access frequencies (i.e., update or read frequencies). Data with similar access frequencies may be assigned to the same group and stored together in one or more data blocks. In some embodiments, data in a particular data group may be stored according to frequencies that data have been accessed together in the past. Data that were accessed together frequently in the past may be stored together in a data block.

In some embodiments, characteristics of each data may be monitored and analyzed. Related data with certain commonalities may more likely be accessed together in the future. The database system may store these related data together in a data block.

Some embodiments of the present disclosure have other aspects, elements, features, and steps in addition to or in place of what is described above. These potential additions and replacements are described throughout the rest of the specification.

BRIEF DESCRIPTION OF THE DRAWINGS

One or more embodiments of the present disclosure are illustrated by way of example and not limited to the figures of the accompanying drawings, in which like references indicate similar elements. One skilled in the art will readily recognize that alternative embodiments of the structures and methods illustrated herein may be employed without departing from the principles of the invention described herein.

DETAILED DESCRIPTION

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment. Such references mean at least one of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Figure 1:
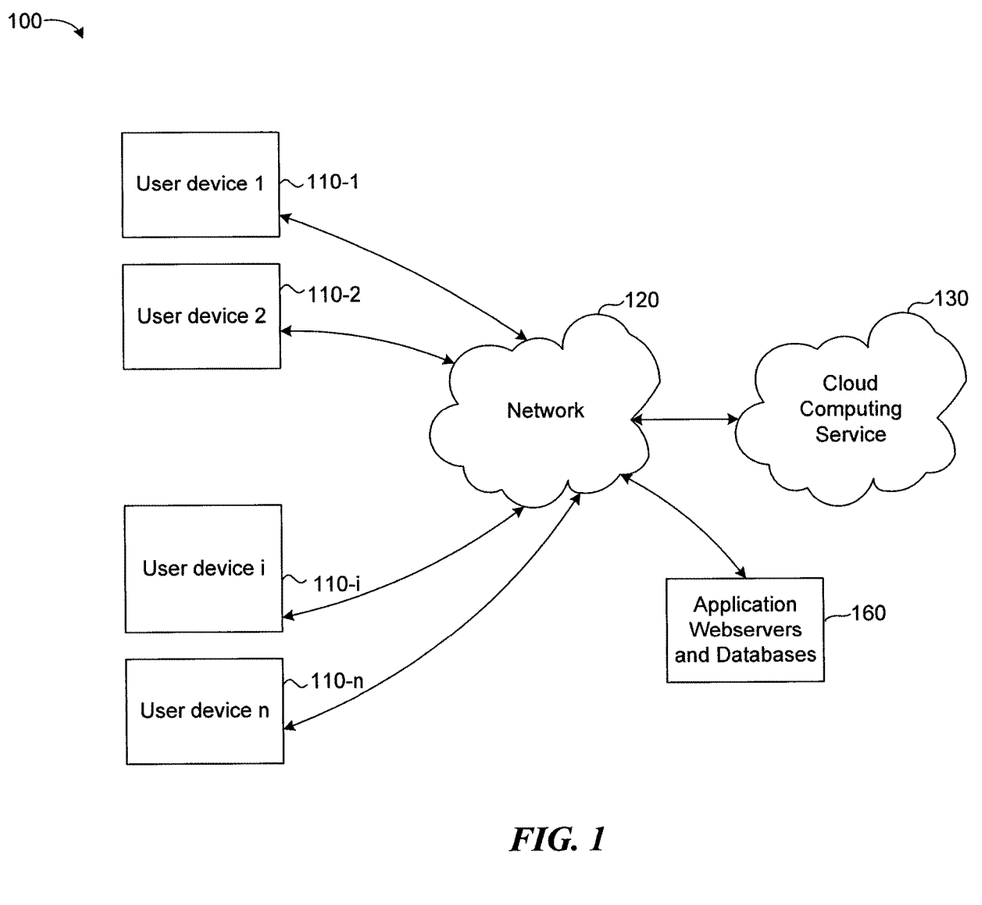
FIG. 1 illustrates a schematic block diagram of a system for data storage over a network according to one embodiment(s) of the present disclosure.

FIG. 1 illustrates a schematic block diagram of a system for data storage over a network according to one embodiment(s) of the present disclosure. The system 100 includes one or more webservers and databases 160. The one or more webservers and databases 160 may include one or more computer systems that are coupled to the network 120 and a cloud computing service 130. Each computer system may have one or more IP addresses. In some embodiments, the one or more computer systems may be located at the same physical location. In some embodiments, the one or more computer systems may be located at multiple physical locations.

The one or more webservers and databases 160 are coupled to a plurality of user devices 110-1 through 110-n (referred to generally as user devices 110) via the network 120. The user devices 110 may include a device having communication capability. For example, types of the user devices 110 may include one or more from a group comprising a personal computer (PC), a tablet PC, a laptop computer, a set-top box (STB), a personal digital assistant (PDA), a cellular telephone, an iPhone®, an iPad®, a computational device, a web-browsing device, a television (e.g., with a set top box and/or a remote control), a vehicle-based device, and/or any suitable portable, mobile, stationary, and handheld communication device.

The network 120 may include one or more networks of any type (i.e., wired and/or wireless). For example, the network 120 may include a wide area network (WAN), a local area network (LAN), an ad hoc network, the Internet, an intranet, a personal area network (PAN), a storage area network, a home area network, a campus area network, a backbone network, a metropolitan area network (MAN), an enterprise private network, a virtual private network, a virtual network, a cellular telephone network, a satellite network, a telephone network (i.e., a Public Switched Telephone Network (PSTN)), an internet-work or a combination of two or more of these. The network 120 may use technologies such as Ethernet as defined by IEEE 802.XX, 4G Long Term Evolution (LTE), 3rd Generation Partnership Project (3GPP), Global System for Mobile Communications (GSM), Enhanced Data Rates for GSM Evolution (EDGE), Universal Mobile Telecommunications System (UMTS), High Speed Packet Access (HSPA), Code Division Multiple Access (CDMA), Worldwide Interoperability for Microwave Access (WiMAX), International Mobile Telecommunications-Advanced (IMT-Advanced) or a combination of two or more of these.

The networking protocols used in the network 120 may include Transmission Control Protocol (TCP) and Internet Protocol (IP), Internetwork Packet Exchange/Sequenced Packet Exchange (IPX/SPX), User Datagram Protocol (UDP), Internet Control Message Protocol (ICMP), Hypertext Transfer Protocol (HTTP), Post Office Protocol (POP3), File Transfer Protocol (FTP), Internet Message Access Protocol (IMAP), X.25, AX.25, AppleTalk or a combination of two or more of these. Data exchanged over the network 120 may be represented using formats such as HTML, SGML-based HTML and/or XML-based HTML etc.

A specific user can set up and/or modify a user profile with the one or more webservers and databases 160 through a user device 110 coupled to the network 120. In some embodiments, the specific user can post, add and/or update content on the one or more webservers and databases 160. By way of example, the content may include videos, photos, broadcast streams, soundtracks, drawings, blogs, links, schedules or any other digital content. The one or more webservers and databases 160 may monitor, update and maintain user records associated with each user.

Figure 2:
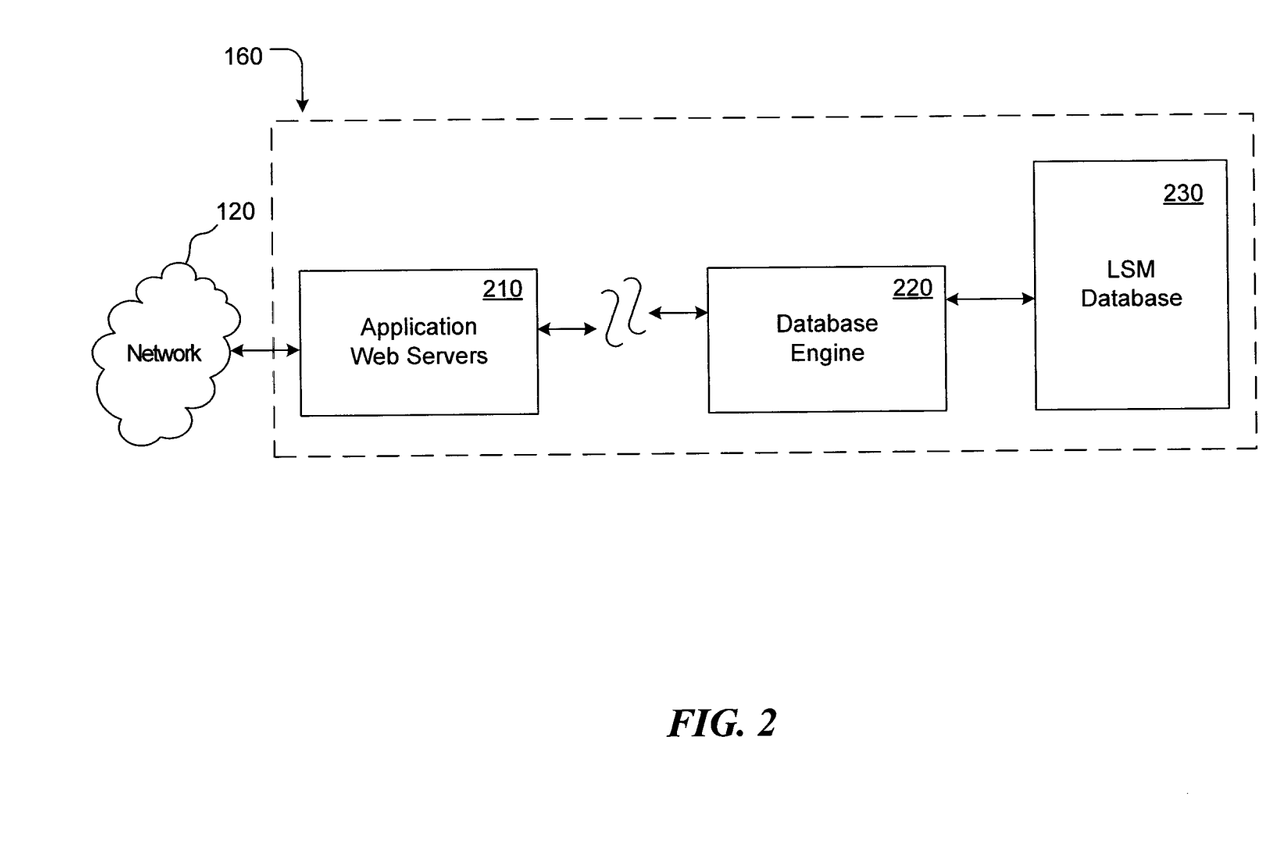
FIG. 2 illustrates an example of data storage according to another embodiment(s) of the present disclosure.

FIG. 2 illustrates an example of data storage according to another embodiment(s) of the present disclosure. In some embodiments, the one or more webservers and databases 160 may include one or more application webservers 210 and one or more LSM databases 230. Read and write requests may be received from the one or more application webservers 210 and satisfied by access to the one or more LSM databases 230. The read and write requests may be executed locally or remotely by one or more database engines 220. In some embodiments, the one or more database engines 220 may be incorporated in the one or more LSM databases 230. The one or more LSM databases 230 may be defined as a computer system for serving data to users. The one or more LSM databases 230 may be a computer system as described in FIG. 6. In some embodiments, the one or more LSM databases 230 may be, for example, a Hadoop machine, a file server machine or a computer connected to multiple storage devices.

The one or more LSM databases 230 may contain any type of computer writable and readable storage media. By way of example, the storage media may include a volatile memory (i.e., a random access memory (RAM) etc.), a non-volatile memory (i.e., a flash memory, a read-only memory (ROM) etc.), a hard disk, an optical disc, a floppy disk, a magnetic tape, a solid-state drive (SSD), a secure digital (SD) card, or any suitable computer-readable storage medium or a combination of two or more of these.

The one or more LSM databases 230 may be configured to allow the one or more application webservers 210 to overwrite data record(s) in the databases. Upon receiving an overwrite request of a specific data record, the one or more LSM databases 230 may write the new data record to a new location in the storage media and serve the succeeding read-requests for the data record from the new location. The older version of the data record may be effectively hidden from the succeeding read-requests. Upon receiving a read-request of a specific data record, the one or more LSM databases 230 may inspect multiple locations in the storage media to locate the most recent version of the specific data record.

In some embodiments, the one or more LSM databases 230 may be implemented by using a multi-tiered caching architecture, where multiple levels of data are created by use of LSM trees according to how recently the data have been updated.

Figure 3:
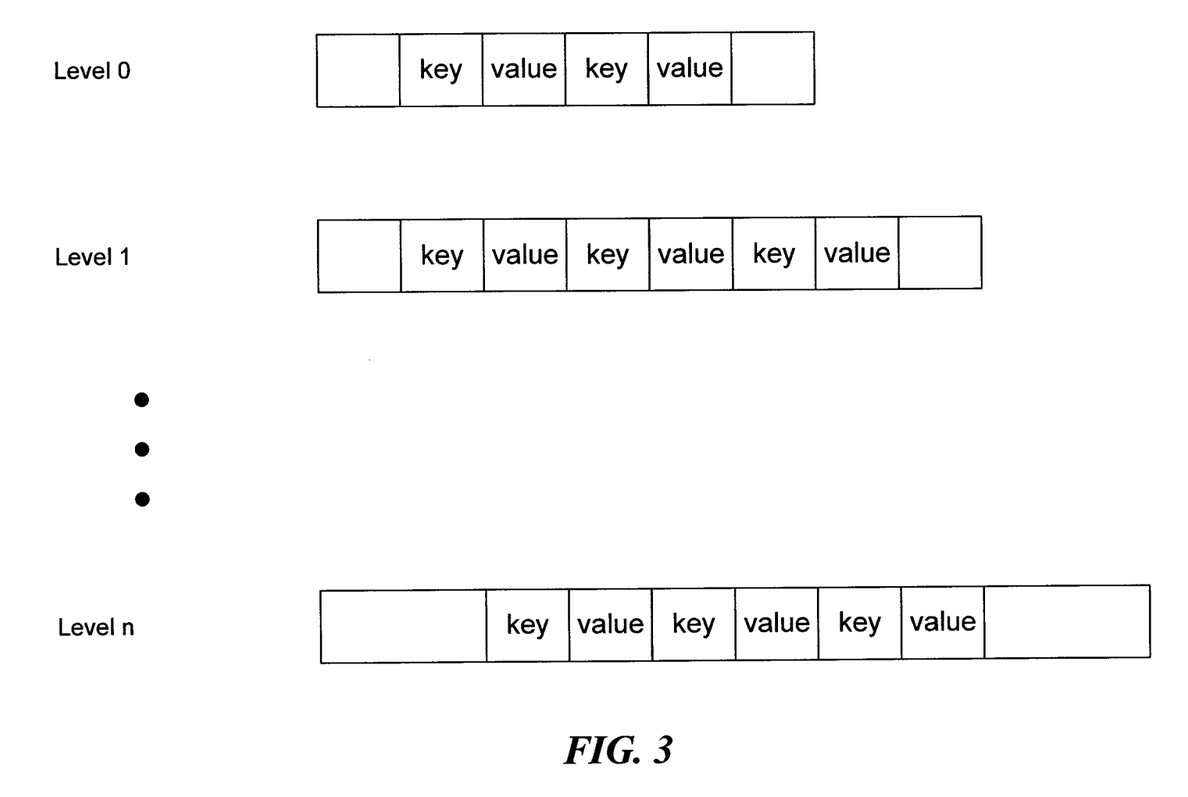
FIG. 3 illustrates an example of organized data in the form of tiers, in accordance with yet another embodiment of the invention.

FIG. 3 illustrates an example of organized data records in the form of tiers, in accordance with yet another embodiment of the invention. Level 0 refers to the most recent data record(s) while Level 1 through Level n stores data records that existed earlier. Each level of data can be assigned to an appropriate storage tier. A periodic compaction process trolls through the data in each level, deleting overwritten records, writing the newly compacted data to a new level and deleting the data that has been just processed.

In the one or more LSM databases 230, a log file may be used to store a sequence of recent updates and each new update is appended to the existing log file. When the log file reaches a pre-determined size, such as 4 MB etc., it may be converted to a sorted table and a new log file is created for future updates.

In some embodiments, a sorted table may be used to store a sequence of entries sorted by key. Each entry is either a value for the key, or a deletion marker for the key. Deletion markers may be kept to hide obsolete values present in older sorted tables. A set of sorted tables may be organized into a sequence of levels.

In some embodiments, the sorted table generated from a log file may be placed in the Level 0. When the number of files in the Level 0 exceeds a predetermined threshold, all files in the Level 0 may be merged together with all of the overlapping Level 1 files to produce a sequence of new Level 1 files. When the combined size of all files in Level L, L≥1, exceeds a predetermined size, one file in Level L and all the overlapping files in Level (L+1) may be merged to form a set of new files for Level (L+1). For example, the predetermined size may be $10^L$ MB (i.e., 10 MB for Level 1, 100 MB for Level 2, etc.).

In some implementations, files in the Level-0 may contain overlapping keys while files in other levels have distinct non-overlapping key ranges. In compaction at non-zero level, the entire file at Level (L+1) is used as input to the compaction and discarded after the compaction. Since files in the Level-0 may contain overlapping keys, compaction from Level 0 to Level 1 may pick more than one Level 0 files in case some of them overlap with each other.

In some embodiments, the one or more LSM databases 230 may be configured to store files in new levels on lower-latency storage media and store files in older levels on higher-latency storage media. For an example, if an LSM database has 7 data levels and is deployed on a machine having a RAM, a SSD and a magnetic disk, the LSM database may store files in the first 2 levels on the RAM, files in the next 2 levels on the SSD and files in the last 3 levels on the magnetic disk. For another example, if an LSM database that has 10 levels is deployed on a computer system having a RAM and a magnetic disk, the LSM database may store files in the newer levels (i.e., the first 3 levels) on the SSD and files in the older levels (i.e., the last 7 levels) on the magnetic disk. During compaction, recent files may be kept on the storage media with less latency while older files may be migrated to slower storage media.

Files in the one or more LSM databases 230 may be organized in the form of small-size data blocks (i.e., 16 k to 64 k). A block may contain a number of data records. When a specific data record in the data block is requested, the entire data block may be read into a low-latency storage media (i.e., a memory). If any data record(s) in the data block is requested in the subsequent read request, the request can be satisfied by reading the data record(s) directly from the low-latency storage media.

In some embodiments, data records stored within a particular level, particularly data stored in a higher-latency storage tier, may be separated into hot and cold data records according to how frequently and/or recently the data records have been accessed (i.e., the number of times the data records have been updated or read during a predetermined period of time). The one or more LSM databases 230 may monitor and/or analyze the access statistics of each data record. During a minor or major compaction, hot data records and cold data records may be split into separate physical sections (i.e., separate storage blocks) of a given storage tier.

For example, during a minor compaction process, the one or more LSM databases 230 may read a specific data record of a particular data block from Level 3 and write out the processed data to Level 4. Data records in the specific data block can be divided into hot data records and cold data records according to their access statistics. Hot and cold data records may be written to a first data block and a second data block, respectively. Both the first and second data blocks belong to Level 4 while the first data block may be written to Level 0 and cached into memory. When the specific data record is requested and read into memory, all other hot data records in the particular data block may also be read into memory at the same time. This would reduce the likelihood that future read requests of these hot data records would require access to the higher-latency storage tier. Thus, overall read latency in the one or more LSM databases 230 may be reduced.

Further, since data blocks having hot data records are more likely to be cached in a low-latency storage tier than those having cold data records, more hot data records may be cached in the low-latency storage tier. The additional hot data records in the low-latency storage tier (i.e., a memory) may increase the ratio of the number of cache hits to the number of misses, which results in a lower overall read latency in the database.

In some embodiments, data records may be categorized into multiple tiers according to access statistics (i.e., update or read statistics) of each data record. The one or more LSM databases 230 may monitor the access frequency (i.e., update or read frequency) of each specific data record and place the specific data record in an appropriate storage tier. For example, the hottest data records may be stored in a lowest-latency storage tier, colder data records may be stored in an intermediate-latency storage tier, and the coldest data records may be stored in a storage tier with the highest latency.

In some embodiments, data records may be categorized according to how the data records are accessed. For example, the one or more application webservers 210 and/or the one or more LSM databases 230 may monitor the access activities of each specific data record and save the specific data record in a particular data block with other data records that have been accessed together in the past. In some embodiments, data records may be categorized according to the characteristics of each data record. Relatedness between separate data records may be statistically analyzed. Separate data records may be stored together if they are more likely to be accessed together in the future. For example, related data records and/or data records more likely to be read together in the future may be stored in the same data block.

Data records may be categorized not only during a major compaction, when upper and middle tiers are combined with the bottom tier into a new bottom tier, but also during minor compaction. Data records stored in a specific upper tier or middle tier may also be split into two or more groups according to how frequently and/or recently the data records have been accessed. Hot and cold data records are then stored in separate data blocks of the given storage tier.

Figure 4:
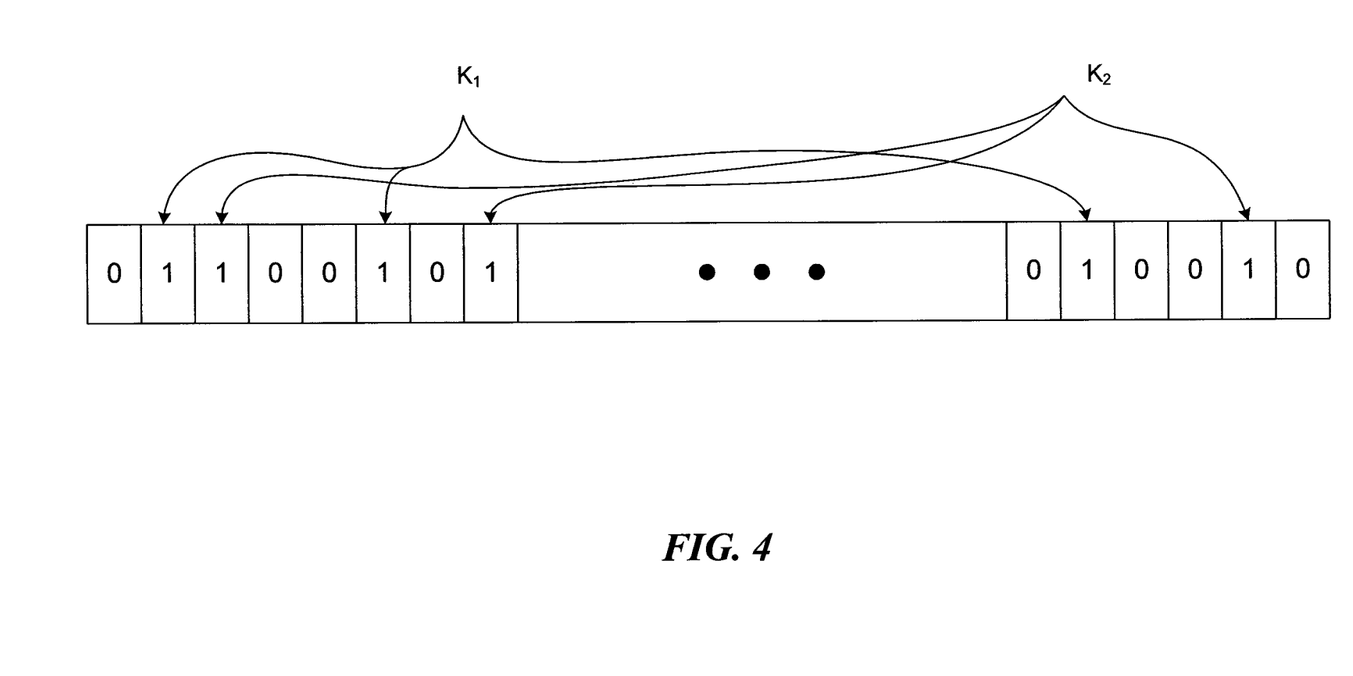
FIG. 4 illustrates an example of a Bloom Filter used for data storage in a system, in accordance with yet another embodiment of the invention.

FIG. 4 illustrates an example of a Bloom Filter used in a system for data storage, in accordance with yet another embodiment of the invention. The one or more LSM databases 230 may use Bloom filters to accelerate scan, point queries and read operations from sorted tables. The Bloom filters may be generic Bloom filters and/or alternative Bloom filters, such as Counting filters, Bloomier filters, Compact approximators, Stable Bloom filters, Scalable Bloom filters and Attenuated Bloom filters etc. In some embodiments, an m-bit Bloom filter may be assigned to multiple-storage tiers, with all bits initially set to 0. In some embodiments, an m-bit Bloom filter may be assigned to each storage tier, with all bits initially set to 0. There are k different hash-functions defined, each of which maps or hashes some set element to one of the m array positions with a uniform random distribution.

When a specific data record is added in a given storage tier, a new entry is added to the m-bit Bloom filter associated with the storage tier. The specific data record is fed to each of the k hash functions (i.e., 10 hash functions) to get k array positions. All of these k array positions are set to 1.

To query for the specific data record, the data record is fed to each of the k hash functions to get k array positions. If any of the bits at these positions are 0, the specific data record is definitely not in the storage tier. If all bits at these array positions are 1, the specific data record may be in the storage tier. The storage tier may be scanned for the specific data record. If the specific data record is found, the query ends. If not, the same operation will be conducted on the next-level storage tier and its associated Bloom filter.

In some embodiments, array positions of an m-bit Bloom filter are updated according to how frequently and/or recently their corresponding data records have been accessed (i.e., the number of times the data records have been updated or read during a predetermined period of time). If all bits at array positions corresponding to a specific data record are 1, the specific data record may be a "hot" data record. If any of the bits at these positions are 0, the specific data record is a "cold" data record. In some implementations, only one array position of the m-bit Bloom Filter may be provided to distinguish a "hot" data record (i.e, k=1). In some implementations, the m-bit Bloom filter is stored in a low latency storage tier (i.e., memory).

Figure 5:
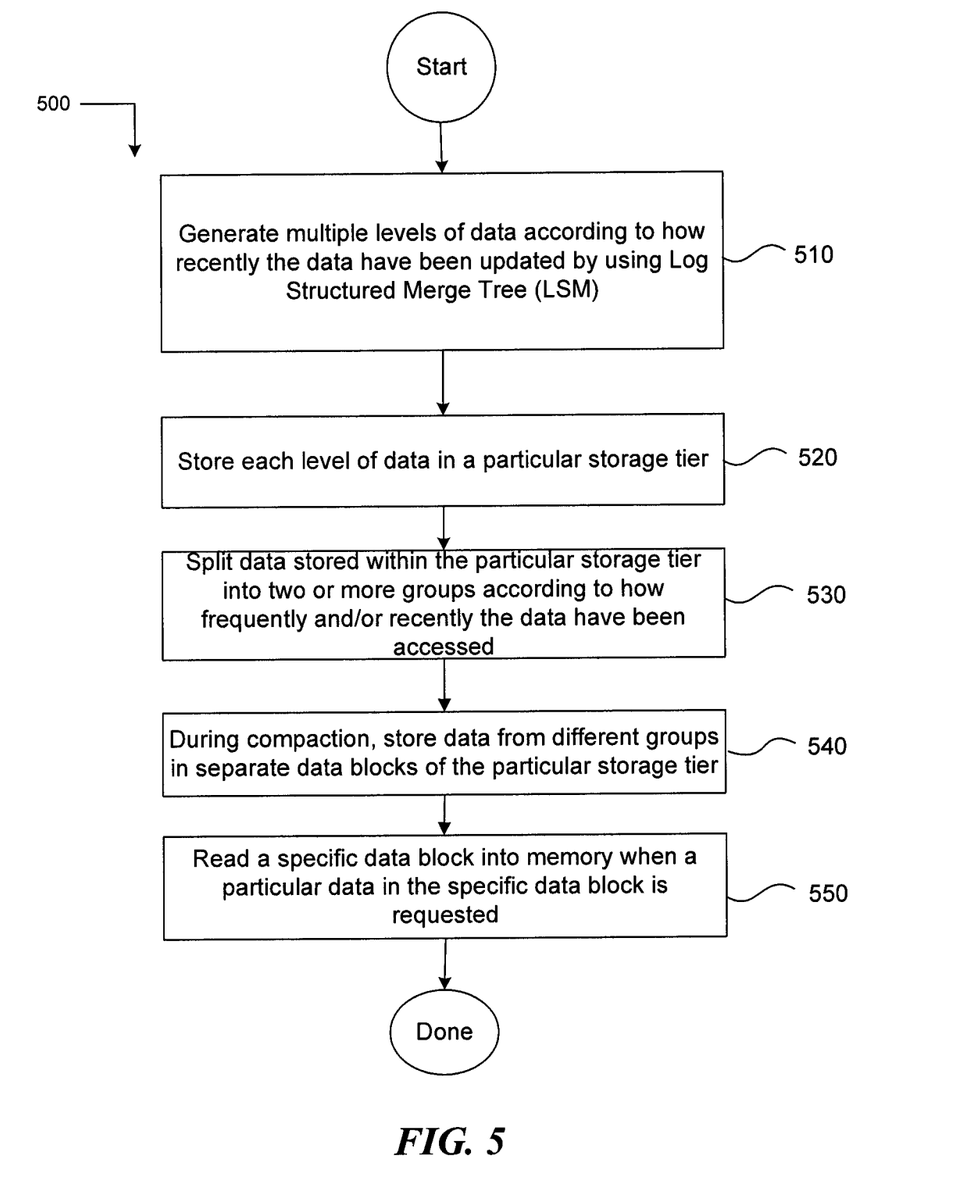
FIG. 5 illustrates a flow chart showing a set of operations 500 that may be used for improving efficiency in an LSM database, in accordance with yet another embodiment of the invention.

FIG. 5 illustrates a flow chart showing a set of operations 500 that may be used for improving efficiency in an LSM database, in accordance with yet another embodiment of the invention. At step 510, multiple levels of data may be generated by using Log Structured Merge Tree (LSM) according to how recently the data have been updated. Upon a write request of a specific data, the LSM database writes the specific data to a new location on an appropriate storage media regardless of whether there is an older version of the specific data in the LSM database. A newest level of data may be generated. In some embodiments, two or more levels of data may be combined into one level of data during compaction. The compaction may be scheduled periodically (i.e., daily, weekly, monthly etc.) and/or when the number of data levels has reached a predetermined cap.

At step 520, each level of data may be assigned to an appropriate storage tier. In some embodiments, data on a newer level may be stored on a specific storage tier with lower latency while data on an older level may be stored on a higher-latency storage tier. The storage tiers may include at least one of a plurality of storage media that comprises a RAM, a SSD, a flash memory, a CD-ROM or a DVD, a magnetic disk and a magnetic tape.

At step 530, data stored within a particular storage tier may be split into two or more groups according to how frequently and/or recently the data have been accessed. In some embodiments, a particular group of data with a pre-determined range of access frequency (i.e., update or read frequency) may be automatically stored in a corresponding and appropriate data groups. Data with the highest access frequencies are stored in the "hottest" data group while data with the lowest access frequencies are stored in the "coldest" data group. In some embodiments, array positions of an m-bit Bloom filter are updated according to how frequently and/or recently their corresponding data records have been accessed. The array positions may be used to distinguish "hot" data from "cold" data.

At step 540, during compaction, different groups of data may be stored in separate data blocks of the particular storage tier. In some embodiments, the LSM database may monitor data access activities and/or characteristics of each data. Data that were accessed together in the past may be stored in the same data blocks. In some implementations, related data that are likely to be accessed in the future may be stored in the same data blocks.

When a particular data in a specific data block is requested, the entire data block is read into memory, step 550. The data block may not only contain the particular data but also other "hot" data. These additional "hot" data in memory reduces the likelihood that future read requests will require access to the high-latency storage tier(s). Overall read latency in the LSM database may be reduced.

While the method 500 of FIG. 5 is described in the context of a single LSM database, the present disclosure contemplates a plurality of synchronous LSM databases. The plurality of synchronous LSM databases can be located at a variety of locations.

Figure 6:
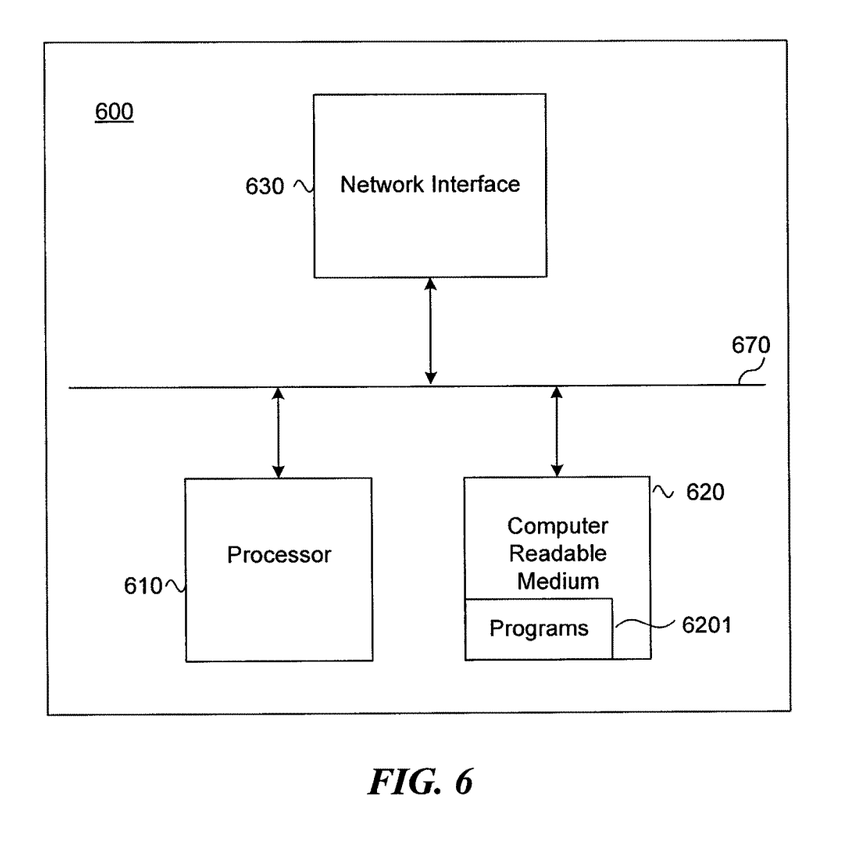
FIG. 6 illustrates a diagram of a computer system, in accordance with yet another embodiment of the invention.

FIG. 6 illustrates a diagram of a computer system 600, in accordance with yet another embodiment of the invention. The computer system 600 may include at least one processor 610, one or more network interface 630 and one or more computer readable medium 620, all interconnected via one or more bus 670. In FIG. 6, various components are omitted for illustrative simplicity. The computer system 600 is intended to illustrate a device on which any other components described in this specification (i.e., any of the components depicted in FIGS. 1-4) can be implemented.

The computer system 600 may take a variety of physical forms. By way of examples, the computer system 600 may be a desktop computer, a laptop computer, a personal digital assistant (PDA), a portable computer, a tablet PC, a wearable computer, an interactive kiosk, a mobile phone, a server, a mainframe computer, a mesh-connected computer, a single-board computer (SBC) (i.e., a BeagleBoard, a PC-on-a-stick, a Cubieboard, a CuBox, a Gooseberry, a Hawkboard, a Mbed, a OmapZoom, a Origenboard, a Pandaboard, a Pandora, a Rascal, a Raspberry Pi, a SheevaPlug, a Trim-Slice, etc.), an embedded computer system, or a combination of two or more of these. Where appropriate, the computer system 600 may include one or more computer systems 600, be unitary or distributed, span multiple locations, span multiple machines, or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

The computer system 600 preferably may include an operating system such as, but not limited to, Windows®, Linux® or Unix®. The operating system may include a file management system, which organizes and keeps track of files. In some embodiments, a separate file management system may be provided. The separate file management can interact smoothly with the operating system and provide enhanced and/or more features, such as improved backup procedures and/or stricter file protection.

The at least one processor 610 may be any suitable processor. The type of the at least one processor 610 may comprise one or more from a group comprising a central processing unit (CPU), a microprocessor, a graphics processing unit (GPU), a physics processing unit (PPU), a digital signal processor, a network processor, a front end processor, a data processor, a word processor and an audio processor.

The one or more bus 670 is configured to couple components of the computer system 600 to each other. As an example and not by way of limitation, the one or more bus 670 may include a graphics bus (i.e., an Accelerated Graphics Port (AGP)), an Enhanced Industry Standard Architecture (EISA) bus, a front-side bus (FSB), a HyperTransport (HT) interconnect, an Industry Standard Architecture (ISA) bus, an Infiniband interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Although the present disclosure describes and illustrates a particular bus, this disclosure contemplates any suitable bus or interconnects.

The one or more network interface 630 may include one or more of a modem or network interface. It will be appreciated that a modem or network interface can be considered to be part of the computer system 600. The interface can include an analog modem, an asymmetric digital subscribe line (ADSL) modem, a cable modem, a doubleway satellite modem, a power line modem, a token ring interface, a Cambridge ring interface, a satellite transmission interface or any suitable interface for coupling a computer system to other computer systems. The interface can include one or more input and/or output devices. The I/O devices can include, by way of example but not limitation, a keyboard, a mouse or other pointing device, disk drives, printers, a scanner, a touch screen, a Tablet screen, and other input and/or output devices, including a display device. The display device can include, by way of example but not limitation, a cathode ray tube (CRT) display, a liquid crystal display (LCD), a 3-D display, or some other applicable known or convenient display device. For simplicity, it is assumed that controllers of any devices not depicted in the example of FIG. 6 reside in the interface.

The computer readable medium 620 may include any medium device that is accessible by the processor 610. As an example and not by way of limitation, the computer readable medium 620 may include volatile memory (i.e., a random access memory (RAM), a dynamic RAM (DRAM), and/or a static RAM (SRAM)) and non-volatile memory (i.e., a flash memory, a read-only memory (ROM), a programmable ROM (PROM), an erasable programmable ROM (EPROM), and/or an electrically erasable programmable ROM (EEPROM)). When appropriate, the volatile memory and/or non-volatile memory may be single-ported or multiple-ported memory. This disclosure contemplates any suitable memory. In some embodiments, the computer readable medium 620 may include a semiconductor-based or other integrated circuit (IC) (i.e., a field-programmable gate array (FPGA) or an application-specific IC (ASIC)), a hard disk, an HDD, a hybrid hard drive (HHD), an optical disc (i.e., a CD-ROM, or a digital versatile disk (DVD)), an optical disc drive (ODD), a magneto-optical disc, a magneto-optical drive, a floppy disk, a floppy disk drive (FDD), a magnetic tape, a holographic storage medium, a solid-state drive (SSD), a secure digital (SD) card, a SD drive, or another suitable computer-readable storage medium or a combination of two or more of these, where appropriate. The computer readable medium 620 may be volatile, non-volatile, or a combination of volatile and non-volatile, where appropriate.

Programs 6201 may be stored on the one or more computer readable media 620. As an example, but not by way of limitation, the computer system 600 may load the programs 6201 to an appropriate location on the one or more compute readable media 620 for execution. The programs 6201, when executed, may cause the computer system 600 to perform one or more operations or one or more methods described or illustrated herein. In some implementations, the operations may include, but are not limited to, generating multiple levels of data according to how recently the data have been updated; storing each level of data in a particular storage tier; splitting data stored in the particular storage tier into two or more groups according to access statistics of each specific data; during compaction, storing data from different groups in separate data blocks of the particular storage tier; and when a particular data in a specific data block is requested, reading the specific data block into a low-latency storage tier.

As will be appreciated by one of ordinary skill in the art, the operations or methods may be instantiated locally (i.e., on one local computer system) and may be distributed across remote computer systems. For example, it may be determined that the available computing power of the local computer system is insufficient or that additional computing power is needed, and may offload certain aspects of the operations to the cloud.

While the computer-readable medium is shown in an embodiment to be a single medium, the term "computer-readable medium" should be taken to include single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

Further examples of computer-readable medium, machine-readable storage medium, machine-readable medium or computer-readable (storage) medium include but are not limited to recordable type medium such as volatile and non-volatile memory devices, floppy and other removable disks, hard disk drives, optical disks, Digital Versatile Disks, among others and transmission type medium such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing provides illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In general, the routines executed to implement the embodiments of the disclosure may be implemented as part of an operating system or a specific application, component, program, object, module or sequence of instructions referred to as "programs." The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but is not limited to." As used herein, the terms "connected," "coupled," or any variant thereof, means any connection or coupling, either direct or indirect, between two or more elements; the coupling of connection between the elements can be physical, logical or a combination thereof. Additionally, the words "herein," "above," "below" and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word, any of the items in the list, all of the items in the list and any combination of the items in the list.

The above detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples—alternative implementations may employ differing values or ranges.

The teaching of the disclosure provided herein can be applied to other systems and not necessarily to the system described above. Any patents and applications and other references noted above, including any that may be listed in accompanying filing papers, are incorporated herein by reference. Aspects of the disclosure can be modified if necessary to employ the systems, functions and concepts of the various references described above to provide yet further embodiments of the disclosure.

Any patents and applications and other references noted above, including any that may be listed in accompanying filing papers, are incorporated herein by reference. Aspects of the disclosure can be modified if necessary to employ the systems, functions, and concepts of the various references described above to provide yet further embodiments of the disclosure.

These and other changes can be made to the disclosure in light of the above Detailed Description. While the above description describes certain embodiments of the disclosure and describes the best mode contemplated, no matter how detailed the above appears in text, the teachings can be practiced in many ways. Details of the system may vary considerably in its implementation details while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally or logically, are understood to be implemented by computer programs or equivalent electrical circuits, microcode or the like. Furthermore, it has also proven convenient at times to refer to these arrangements of operations as modules, without loss of generality. The described operations and their associated modules may be embodied in software, firmware, hardware or any combinations thereof.

Any of the steps, operations or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of medium suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer-readable storage medium and may include any embodiment of a computer program product or other data combination described herein.

What is claimed is:

1. A computer-implemented method for storing data in a database, comprising:
   generating multiple levels of data according to how recently the data have been updated, whereby most recently updated data are assigned to a newest level;
   storing at least some of the levels of data in a specified storage tier of multiple storage tiers according to at least the latency of the storage tiers;
   splitting data stored in a specified storage level of the specified storage tier into multiple data groups according to access statistics of data, wherein a first data group of the data groups includes data whose access statistics satisfy a criterion and a second data group of the data groups includes data whose access statistics do not satisfy the criterion, the specified storage level including multiple data blocks, wherein each data block of a set of the data blocks includes at least some of the data from the first data group and at least some of the data from the second data group, the data groups ranked into the levels according to access frequencies, the splitting further including:

storing data having the highest access frequency among the data groups to a particular data block in one of the levels that contains data with the highest access frequency;

during compaction, generating a first data by extracting, from each data block of the set of the data blocks, data that belongs to the first data group, and         storing the first data in one or more data blocks of the specified storage level, wherein a specified data block of the one or more data blocks includes a set of data records whose access statistics satisfy the criterion;

receiving a request for a specified data record of the set of data records;

reading all of the set of data records into a low-latency storage tier in response to the request for the specified record; and     generating a log update specifying the first data extracted from the set of data blocks during compaction and appending the log update to a log file located in the specified storage level.

2. The computer-implemented method as recited in claim 1, wherein the specified storage tier is a low-latency storage tier, an intermediate-latency storage tier or a high-latency storage tier.

3. The computer-implemented method as recited in claim 1, further comprising: storing separate data to a particular data block in at least one of the tiers if the separate data are more likely to be accessed together according to statistical analysis.

4. The computer-implemented method as recited in claim 1, further comprising:

assigning an m-bit Bloom filter with k hash functions for each of a subset of the storage tiers, with all bits set to 0;

when a new data is added in a given storage tier, getting k array positions by feeding the new data to each of the k hash functions; and     setting the k array positions of the m-bit Boom filter to 1.

5. The computer-implemented method as recited in claim 1, further comprising:

assigning an m-bit Bloom filter with one hash function for each of a subset of the storage tiers, with all bits set to 0;

when a specific data is determined to be "hot," getting a specific array position by feeding the specific data to the hash function; and     setting the specific array position of the m-bit Boom filter to 1.

6. The computer-implemented method as recited in claim 1, wherein the data stored in the specified storage tier are split into the multiple data groups during a minor compaction or a major compaction.

7. The computer-implemented method as recited in claim 1, wherein storage media in the specified storage tier include one or more of a RAM, a DRAM, a SRAM, a flash memory, a ROM, a PROM, an EPROM, an EEPROM, a FPGA, a hard disk, an optical disc, a magneto-optical disc, a floppy disk, a magnetic tape, a holographic storage medium, a solid-state drive and a secure digital card.

8. An apparatus, comprising:

a computer system; and an application program instantiated on the computer system, wherein the application provides computer-generated output;

wherein the computer system is configured to:

generate multiple levels of data according to how recently the data have been updated, whereby most recently updated data are assigned to a newest level;

store at least some of the levels of data in a specified storage tier of multiple storage tiers according to at least the latency of the storage tiers;

split data stored in a specified storage level of the specified storage tier into multiple data groups according to access statistics of data, wherein a first data group of the data groups includes data whose access statistics satisfy a criterion and a second data group of the data groups includes data whose access statistics do not satisfy the criterion, the specified storage level including multiple data blocks, wherein each data block of a set of the data blocks includes at least some of the data from the first data group and at least some of the data from the second data group, the data groups ranked into the levels according to access frequencies, the computer system further configured to store data having the highest access frequency among the data groups to a particular data block in one of the levels that contains data with the highest access frequency;

during compaction, extract, from each data block of the set of the data blocks, data that belongs to the first data group to generate a first data, and             store the first data in one or more data blocks of the specified storage level, wherein a specified data block of the one or more data blocks includes a set of data records whose access statistics satisfy the criterion;

receive a request for a specified data record of the set of data records; and         read all of the set of data records into a low-latency storage tier of the storage tiers in response to the request for the specified record; and         generate a log update specifying the first data extracted from the set of data blocks during compaction and appending the log update to a log file located in the specified storage level.

9. The apparatus as recited in claim 8, wherein the specified storage tier is a low-latency storage tier, an intermediate-latency storage tier or a high-latency storage tier.

10. The apparatus as recited in claim 8, wherein the computer system is configured to store separate data to a particular data block in one of the tiers if the separate data are more likely to be accessed together according to statistical analysis.

11. The apparatus as recited in claim 8, wherein the computer system is configured to:

assign an m-bit Bloom filter with k hash functions for at least a subset of the storage tiers, with all bits set to 0;

when a new data is added in a given storage tier, get k array positions by feeding the new data to each of the k hash functions; and     set the k array positions of the m-bit Boom filter to 1.

12. The apparatus as recited in claim 8, wherein the computer system is configured to:
- assign an m-bit Bloom filter with one hash function for at least a subset of the storage tiers, with all bits set to 0;
- when a specific data is determined to be "hot," getting a specific array position by feeding the specific data to the hash function; and
- setting the specific array position of the m-bit Boom filter to 1.

13. The apparatus as recited in claim 8, wherein the data stored in the specified storage tier are split into the two or more data groups during a minor compaction or a major compaction.

14. The apparatus as recited in claim 8, wherein storage media in the specified storage tier include one or more of a RAM, a DRAM, a SRAM, a flash memory, a ROM, a PROM, an EPROM, an EEPROM, a FPGA, a hard disk, an optical disc, a magneto-optical disc, a floppy disk, a magnetic tape, a holographic storage medium, a solid-state drive and a secure digital card.

15. A non-transitory computer readable storage medium storing instructions execution of which in a computer system causes the computer system to perform a method for storing data in a log-structured merge-tree database, comprising:
- generating multiple levels of data according to how recently the data have been updated, whereby most recently updated data are assigned to a newest level;
- storing at least some of the levels of data in a specified storage tier of multiple storage tiers;
- splitting data stored in a specified storage level of the specified storage tier into multiple data groups according to access statistics of each specific data, wherein a first data group of the data groups includes data whose access statistics satisfy a criterion and a second data group of the data groups includes data whose access statistics do not satisfy the criterion, the specified storage level including multiple data blocks, wherein each data block of a set of the data blocks includes at least some of the data from the first data group and at least some of the data from the second data group, the data groups ranked into the levels according to access frequencies, the splitting further including:
  - storing data having the highest access frequency among the data groups to a particular data block in one of the levels that contains data with the highest access frequency;
- during compaction,
- extracting, from each data block of the set of the data blocks, data that belongs to the first data group to generate a first data, and
- storing the first data in one or more data blocks of the specified storage level, wherein a specified data block of the one or more data blocks includes a set of data records whose access statistics satisfy the criterion;
- receiving a request for a specified data record of the set of data records;
- reading all of the set of data records into a low-latency storage tier of the storage tiers in response to the request for the specified record; and
- generating a log update specifying the first data extracted from the set of data blocks during compaction and appending the log update to a log file located in the specified storage level.

16. The computer readable storage medium as recited in claim 15, further comprising:
- assigning an m-bit Bloom filter with k hash functions for at least a subset of the storage tiers, with all bits set to 0;
- when a new data is added in a given storage tier, getting k array positions by feeding the new data to each of the k hash functions; and
- setting the k array positions of the m-bit Boom filter to 1.

* * * * *